(12) United States Patent
Yu et al.

(10) Patent No.: US 8,089,740 B2
(45) Date of Patent: Jan. 3, 2012

(54) CLAMP UNIT, AND POWER SUPPLY HAVING THE SAME CROSS-REFERENCE TO RELATED APPLICATION

(75) Inventors: Wei-Cheng Yu, Taipei (TW); Yun-Chieh Hsu, Taipei (TW)

(73) Assignees: Silitek Electronic (Guangzhou) Co., Ltd., Guangzhou (CN); Lite-On Technology Corp., Taipei (TW)

( * ) Notice: Subject to any disclaimer, the term of this patent is extended or adjusted under 35 U.S.C. 154(b) by 421 days.

(21) Appl. No.: 12/453,637

(22) Filed: May 18, 2009

(65) Prior Publication Data

US 2010/0176785 A1 Jul. 15, 2010

(30) Foreign Application Priority Data

Jan. 13, 2009 (CN) .......................... 2009 1 0000161

(51) Int. Cl.
*H02H 3/027* (2006.01)

(52) U.S. Cl. ..................................... 361/91.1; 361/91.3

(58) Field of Classification Search .................. 361/91.1, 361/91.3, 91.4
See application file for complete search history.

(56) References Cited

U.S. PATENT DOCUMENTS 6,028,755 A * 2/2000 Saeki et al. .................. 361/91.1
* cited by examiner

*Primary Examiner* — Shawn Riley
(74) *Attorney, Agent, or Firm* — Rosenberg, Klein & Lee

(57) ABSTRACT

A clamp unit is adapted for controlling a clamp switch of a power supply such that the power supply outputs an output voltage in an ON mode when the clamp switch is in an ON-state and that the power supply does not output the output voltage in an OFF mode when the clamp switch is in an OFF-state. The clamp unit includes: a coupling circuit for outputting a coupling voltage in response to first and second reference voltages, and a control signal outputted by a control signal generating circuit in response to an input voltage; and a detecting circuit for outputting a clamp signal to the clamp switch in response to a first signal indicating whether the power is in the ON mode or the OFF mode, and a second signal indicating whether the power supply is to output the output voltage.

8 Claims, 7 Drawing Sheets

CLAMP UNIT, AND POWER SUPPLY HAVING THE SAME CROSS-REFERENCE TO RELATED APPLICATION

CROSS-REFERENCE TO RELATED APPLICATION

This application claims priority of Chinese Application No. 200910000161.X, filed on Jan. 13, 2009.

BACKGROUND OF THE INVENTION

1. Field of the Invention

The invention relates to a power supply, more particularly to a power supply including a clamp unit that has superior reliability during use.

2. Description of the Related Art

FIG. 1 illustrates a conventional power supply 900 that receives an input voltage (Vi), such as an AC voltage, from a power source 901 and outputs an output voltage (Vout) supplied to an external load 902, such as a main board. The conventional power supply 900 includes: a voltage generating unit 91 for receiving the input voltage (Vi) from the power source 901 so as to output a working voltage and a standby voltage; a monitoring unit 93 operable so as to generate a power good signal (PG) indicating whether the conventional power supply 900 outputs the output voltage (Vout), and a fault protection signal (FP) indicating whether the conventional power supply 900 is to output the output voltage (Vout); a control unit 94 for receiving the working voltage from the voltage generating unit 91 so as to output the output voltage (Vout); and an optical coupler 92 including first and second optical elements 921, 922 and coupled among the voltage generating unit 91, the monitoring unit 93 and the control unit 94.

When the conventional power supply 900 outputs the output voltage (Vout) in an ON mode, the power good signal (PG) has a high logic level, and the fault protection signal (FP) has a low logic level. Therefore, the optical coupler 92 establishes electrical connection between the voltage generating unit 91 and the monitoring unit 93, and thus electrical connection between the voltage generating unit 91 and the control unit 94 such that the control unit 94 receives the working voltage from the voltage generating unit 91 through the second optical element 922 of the optical coupler 92. On the other hand, when the conventional power supply 900 does not output the output voltage (Vout) in an OFF mode, the power good signal (PG) has a low logic level, and the fault protection signal (FP) has a high logic level. Therefore, the optical coupler 92 interrupts electrical connection between the voltage generating unit 91 and the control unit 94, i.e., the second optical element 922 does not conduct, such that the control unit 94 cannot receive the working voltage from the voltage generating unit 91.

Referring to FIG. 2, when the conventional power supply 900 is accidentally disconnected from the power source 901 during the ON mode, i.e., an input indicating signal for indicating whether the power source 901 is coupled to the conventional power supply 900 is switched from a high logic level to a low logic level, the conventional power supply 900 is switched from the ON mode to a virtual OFF mode, where the fault protection signal (FP) outputted by the monitoring unit 93 has the low logic level and where the power good signal (PG) outputted by the monitoring unit 93 has the low logic level, in response to the input voltage indicating signal. Therefore, energy attributed to the working voltage is released through the second optical element 922 of the optical coupler 92, a resistor (R2) and the external load 902 such that the output voltage (Vout) drops to zero. In this case, a warning time period (T4) is defined from the time when the power good signal (PG) is switched to the low logic level to the time when the output voltage (Vout) drops to 95% of the high logic level thereof. At the same time, energy attributed to the standby voltage is released through the first optical element 921 of the optical coupler 92, a resistor (R1) and other loads (not shown), such as a mouse and a keyboard, such that the standby voltage gradually drops. In this case, a turn off-standby time period (T5) is defined from the time when the output voltage (Vout) drops to 10% of the high logic level thereof to the time when the standby voltage drops to 95% of the high logic level thereof. It is noted that the warning time period (T4) depends on the external load 902. For example, when the external load 902 is a heavy load, the warning time period (T4) is about 4 ms, as shown in FIG. 3. When the external load 902 is a light load, the warning time period (T4) is about 53 ms, as shown in FIG. 4.

Furthermore, if the standby voltage is supplied to relatively light loads, the turn off-standby time period (T5) is prolonged. Thus, the monitoring unit 93 deactivates the control unit 94 upon detecting that the output voltage (Vout) drops to zero while the standby voltage (T5) has a high logic level. Thereafter, due to the deactivation of the control unit 94, the conventional power supply 900 cannot be reset to output the output voltage (Vout). Therefore, the conventional power supply 900 has an inferior reliability during use.

SUMMARY OF THE INVENTION

Therefore, an object of the present invention is to provide a power supply that can overcome the aforesaid drawbacks of the prior art.

According to one aspect of the present invention, there is provided a power supply adapted for receiving an input voltage from a power source and for outputting an output voltage. The power supply comprises:

a voltage generating unit adapted to be coupled to the power source for receiving the input voltage therefrom so as to output a working voltage;

a monitoring unit operable so as to generate a first signal indicating whether the power supply is operated in an ON mode, where the power supply outputs the output voltage, or an OFF mode, where the power supply does not output the output voltage, and a second signal indicating whether the power supply is to output the output voltage;

a control unit for receiving the working voltage from the voltage generating unit so as to output the output voltage;

a clamp unit adapted to be coupled to the power source and the voltage generating unit for receiving the input voltage and the working voltage therefrom, and coupled to the monitoring unit for receiving the first and second signals therefrom and for outputting a clamp signal in response to the first and second signals from the monitoring unit;

a clamp switch coupled between the voltage generating unit and the monitoring unit, and having a control end coupled to the clamp unit for receiving the clamp signal therefrom, the clamp switch being operable between an ON-state and an OFF-state in response to the clamp signal from the clamp unit; and a coupling unit coupled among the clamp switch, the voltage generating unit, the monitoring unit and the control unit.

When the clamp switch is in the ON-state, the coupling unit is operable, in response to the second signal from the monitoring unit, so as to establish electrical connection between the voltage generating unit and the control unit such that the control unit receives the working voltage from the voltage generating unit through the coupling unit.

When the power supply is switched from the ON mode to the OFF mode, the clamp switch is switched from the ON-state to the OFF-state in response to the clamp signal from the clamp unit such that the coupling unit interrupts electrical connection between the voltage generating unit and the control unit. The control unit outputs the output voltage that drops to a low level after a warning time period in response to electrical disconnection between the voltage generating unit and the control unit.

According to another aspect of the present invention, there is provided a clamp unit adapted for controlling a clamp switch of a power supply such that the power supply is in an ON mode, where the power supply outputs an output voltage, when the clamp switch is in an ON-state and that the power supply is in an OFF mode, where the power supply does not output the output voltage, when the clamp switch is in an OFF-state. The clamp unit comprises:

a control signal generating circuit for outputting a control signal in response to receipt of an input voltage;

a coupling circuit coupled to the control signal generating circuit for receiving the control signal therefrom so as to output a coupling voltage in response to first and second reference voltages and the control signal; and a detecting circuit coupled to the coupling circuit for receiving the coupling voltage therefrom, and adapted to output a clamp signal to the clamp switch in response to the coupling voltage from the coupling circuit, a first signal from the power supply indicating whether the power supply is in the ON mode or the OFF mode, and a second signal from the power supply indicating whether the power supply is to output the output voltage.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
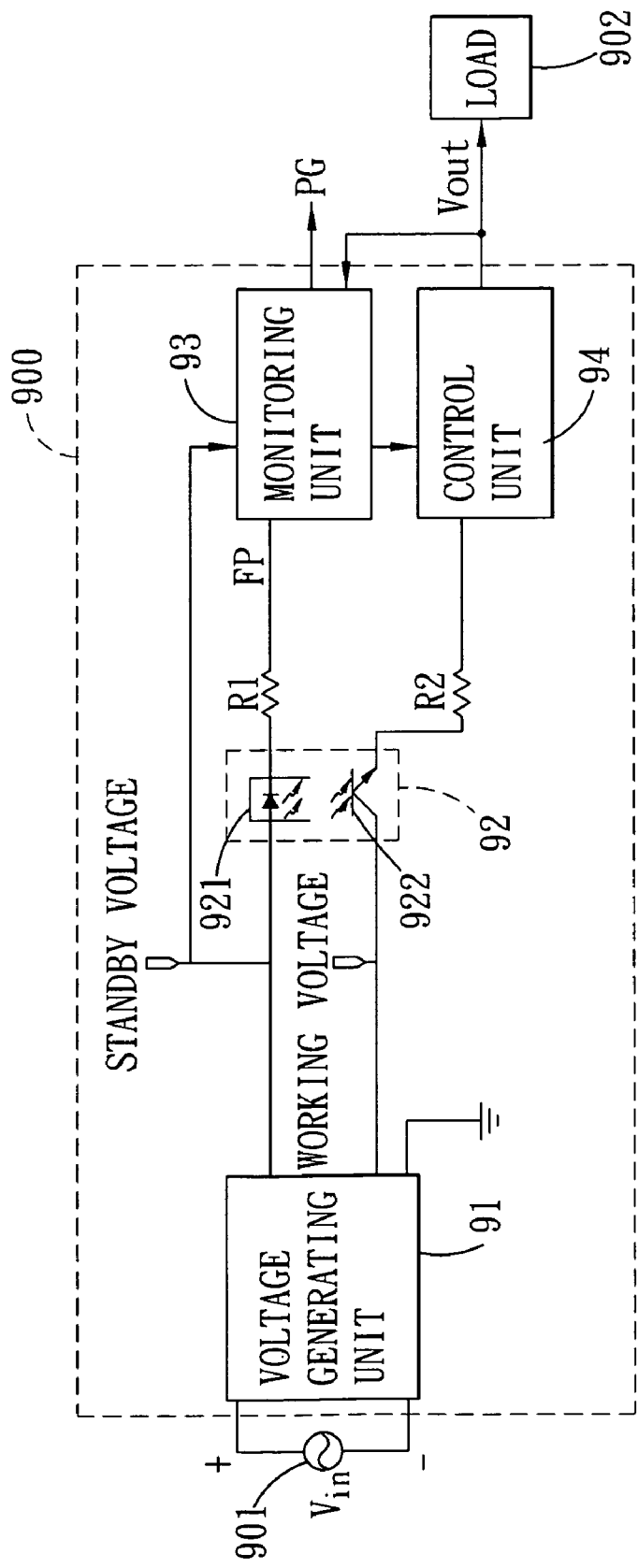
FIG. 1 is a schematic circuit block diagram illustrating a conventional power supply.
Figure 2:
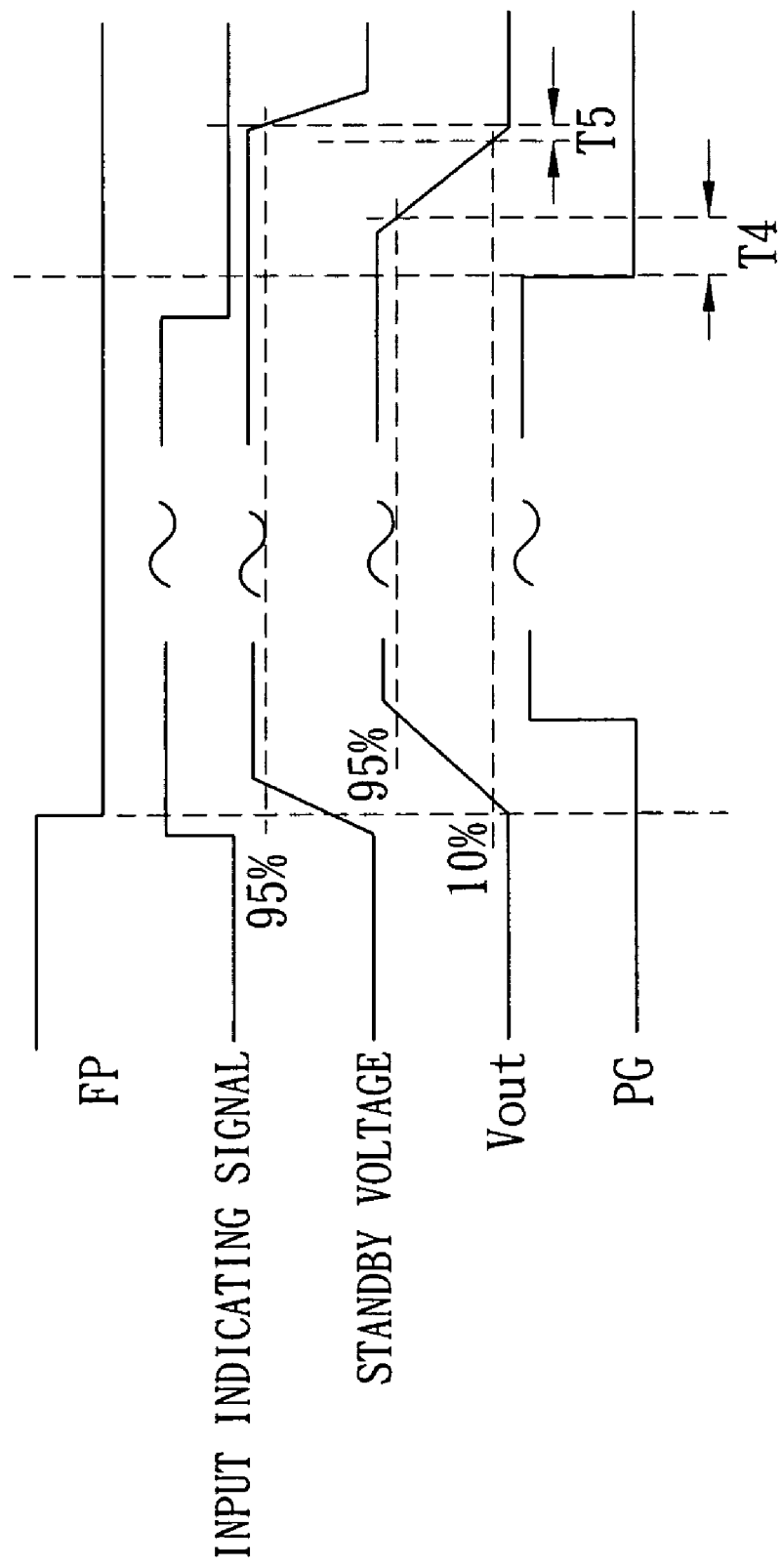
FIG. 2 illustrates timing diagrams of a power good signal (PG), a fault protection signal (FP), an output voltage (Vout) and a standby voltage generated by the conventional power supply, and an input indicating signal for describing a warning time period (T4) and a turnoff-standby time period (T5) when the conventional power supply is switched from an ON mode to a virtual OFF mode.
Figure 3:
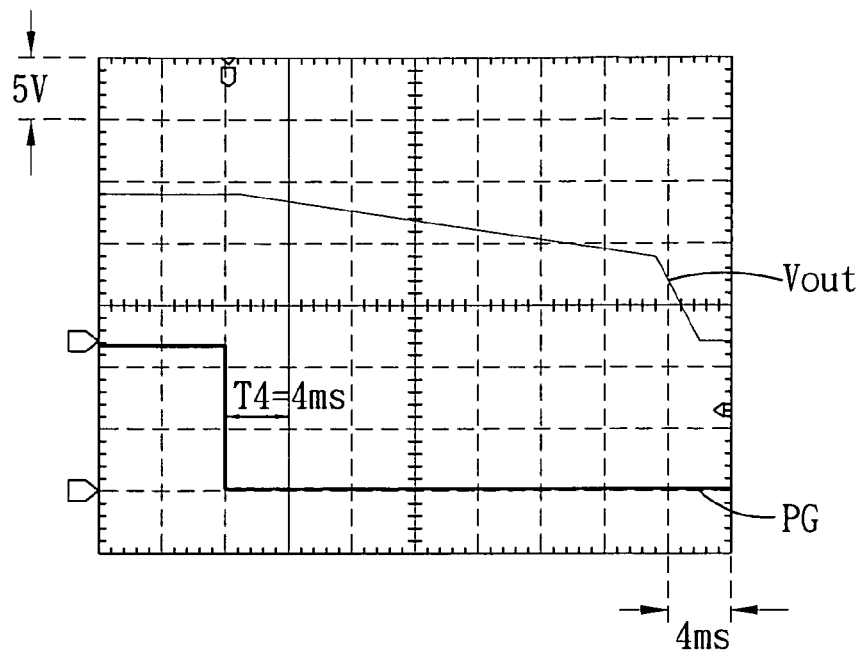
FIG. 3 is a plot illustrating experimental measurement results of the output voltage (Vout) and the power good signal (PG) when the conventional power supply is coupled to a heavy load.
Figure 4:
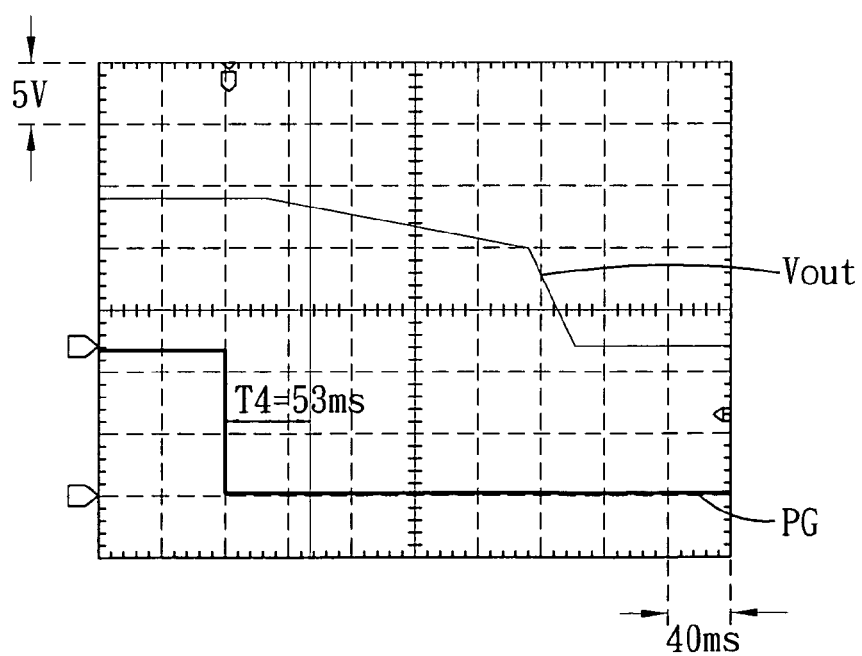
FIG. 4 is a plot illustrating experimental measurement results of the output voltage (Vout) and the power good signal (PG) when the conventional power supply is coupled to a light load.
Figure 5:
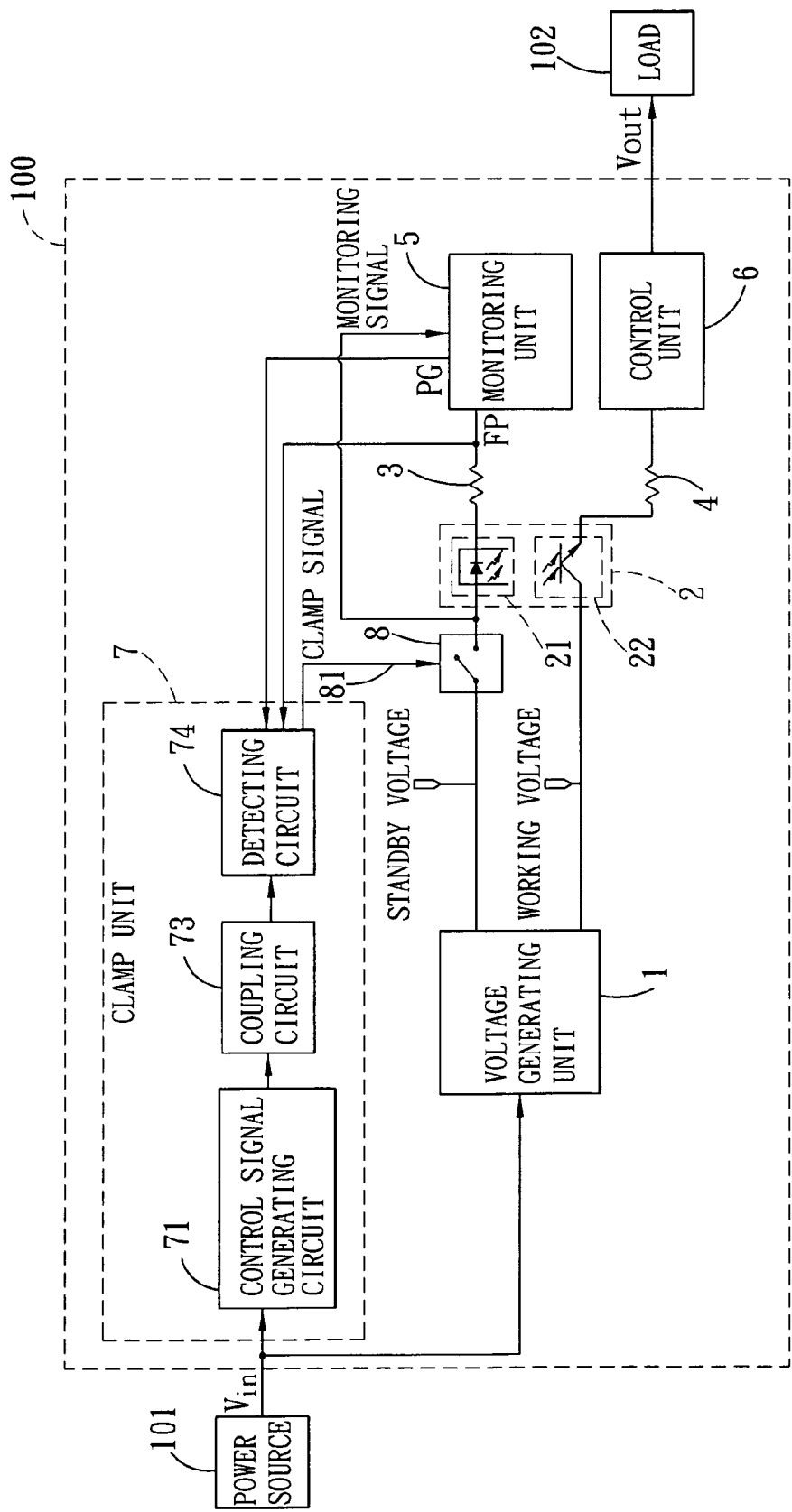
FIG. 5 is a schematic circuit block diagram illustrating the preferred embodiment of a power supply according to the present invention.

Referring to FIG. 5, the preferred embodiment of a power supply 100 according to the present invention is shown to be adapted for receiving an input voltage (Vin), such as an AC voltage, from a power source 101 and for outputting an output voltage (Vout). The power supply 100 includes a voltage generating unit 1, a monitoring unit 5, a control unit 6, a clamp unit 7, a clamp switch 8, and a coupling unit 2.

The voltage generating unit 1 is adapted to be coupled to the power source 101 for receiving the input voltage (Vin) therefrom so as to output a working voltage and a standby voltage.

The monitoring unit 5 is operable so as to generate a power good signal serving as a first signal and indicating whether the power supply 100 is operated in an ON mode, where the power supply 100 outputs the output voltage (Vout), or an OFF mode, where the power supply 100 does not output the output voltage (Vout), and a fault protection signal (FP) serving as a second signal and indicating whether the power supply 100 is to output the output voltage (Vout). In this embodiment, the power good signal (PG) has a high logic level when the power supply 100 is in the ON mode, and has a low logic level when the power supply 100 is in the OFF mode. When the power supply 100 is in the ON mode, the fault protection signal (FP) has a low logic level.

The control unit 6 is adapted to be coupled to an external load 102, receives the working voltage from the voltage generating unit 1, and outputs the output voltage (Vout) to the load 102.

The clamp switch 8 is coupled between the voltage generating unit 1 and the monitoring unit 5, and has a control end 81 coupled to the clamp unit 7 for receiving a clamp signal therefrom. The clamp switch 8 is operable between an ON-state and an OFF-state in response to the clamp signal from the clamp unit 7. In this embodiment, the clamp switch 8 is a pnp transistor having a base that serves as the control end 81. In this case, when the clamp signal has a low logic level, the clamp switch 8 is in the ON-state. When the clamp signal has a high logic level, the clamp switch 8 is in the OFF-state.

The coupling unit 2 is coupled among the clamp switch 8, the voltage generating unit 1, the monitoring unit 5 and the control unit 6. In this embodiment, the coupling unit 2 is an optical coupler that includes a first optical element 21 coupled between the clamp switch 8 and the monitoring unit 5 and receiving the fault protection signal (FP), and a second optical element 22 coupled between the voltage generating unit 1 and the control unit 6.

When the clamp switch 8 is in the ON-state, the coupling unit 2 is operable, in response to the fault protection signal (FP) from the monitoring unit 5, so as to establish electrical connection between the voltage generating unit 1 and the control unit 6 such that the control unit 6 receives the working voltage from the voltage generating unit 1 through the second optical element 22 of the coupling unit 2.

Figure 6:
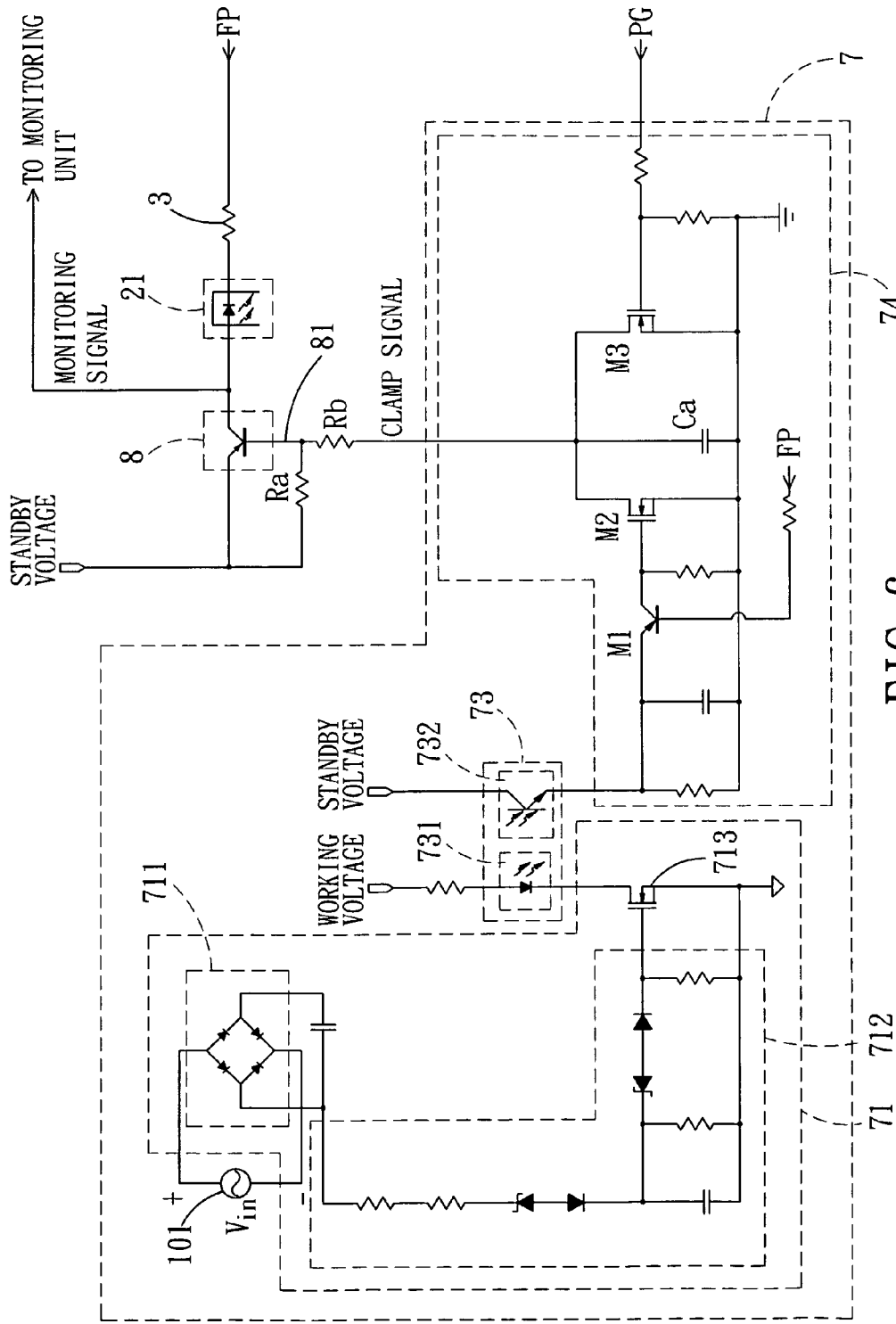
FIG. 6 is a schematic electrical circuit diagram illustrating a clamp unit and a clamp switch of the preferred embodiment.

Referring further to FIG. 6, the clamp unit 7 is adapted to be coupled to the power source 101 and the voltage generating unit 1 for receiving the input voltage (Vin) and the working and standby voltages therefrom, and is coupled to the control end 81 of the clamp switch 8 and the monitoring unit 5 for receiving the power good signal (PG) and the fault protection signal (FP) from the monitoring unit 5 and for outputting the clamp signal to the control end 81 of the clamp switch 8 in response to the power good signal (PG) and the fault protection signal (FP) from the monitoring unit 5. In this embodiment, the clamp unit 7 includes a control signal generating circuit 71, a coupling circuit 73, and a detecting circuit 74.

The control signal generating circuit 71 is adapted to be coupling to the power source 101, and outputs a control signal in response to receipt of the input voltage (Vin) from the power source 101. In this embodiment, the control signal generating circuit 71 includes a full-bridge rectifier 711, a filter regulator 712 and a switch 713. Since the configuration of the filter regulator 712 is known to those skilled in the art, details of the same are omitted herein for the sake of brevity. When the control signal generating circuit 71 receives the input voltage (Vin), the control signal has a low logic level.

The coupling circuit 73 is coupled to the voltage generating unit 1 and the control signal generating circuit 71, receives the control signal and the working and standby voltages therefrom, and outputs a coupling voltage. In this embodiment, the coupling circuit 73 is an optical coupler including a first optical element 731 coupled to the switch 713 of the control signal generating circuit 71 and receiving the working voltage from the voltage generating unit 1, and a second optical element 732 for receiving the standby voltage from the voltage generating unit 1. When the control signal outputted by the control signal generating circuit 71 has the low logic level as a result of receipt of the input voltage (Vin) by the control signal generating circuit 71, the coupling voltage has a high logic level, i.e., the standby voltage.

The detecting circuit 74 is coupled to the monitoring unit 5 and the coupling circuit 73, and outputs the clamp signal in response to the coupling voltage from the coupling circuit 73, and the power good signal (PG) and the fault protection signal (FP) from the monitoring unit 5. In this embodiment, the detecting circuit 74 includes a pnp transistor (M1), a first NMOS transistor (M2) and a second NMOS transistor (M3). The pnp transistor (M1) has an emitter coupled to the coupling circuit 73, a base coupled to the monitoring unit 5 for receiving the fault protection signal (FP), and a collector. The first NMOS transistor (M2) has a drain coupled to the control end 81 of the clamp switch 8, a gate coupled to the collector of the pnp transistor (M1), and a grounded source. The second NMOS transistor (M3) has a drain coupled to the drain of the first NMOS transistor (M2), a gate coupled to the monitoring unit 5 for receiving the power good signal (PG) therefrom, and a grounded source. It is noted that the first and second NMOS transistors (M2, M3) constitute a NOR gate circuit such that the clamp signal becomes the low logic level when one of the first and second NMOS transistors (M2, M3) conducts. In other embodiments, the first and second NMOS transistors (M2, M3) can be replaced by a circuit equivalent to a NOR gate circuit.

In such a configuration, when the power supply 100 is switched from the ON mode to the OFF mode, the coupling voltage outputted by the coupling circuit 73 is switched from the high logic level to a low logic level while the power good signal (PG) is switched from the high logic level to the low logic level such that the clamp signal outputted by the detecting circuit 74 is switched from the low logic level to the high logic level. Therefore, the clamp switch 8 is switched from the ON-state to the OFF-state in response to the clamp signal from the detecting circuit 74 such that the coupling unit 2 interrupts electrical connection between the voltage generating unit 1 and the control unit 6. The control unit 6 outputs the output voltage (Vout) that drops to a low level after a warning time period (T4) in response to electrical disconnection between the voltage generating unit 1 and the control unit 6.

Furthermore, the clamp switch 8 outputs a monitoring signal to the monitoring unit 5. When the power supply 100 is switched from the OFF mode to the ON mode, the clamp switch 8 is switched from the OFF-state to the ON-state, and the monitoring signal outputted by the clamp switch 8 is switched from a low logic level to a high logic level.

Figure 7:
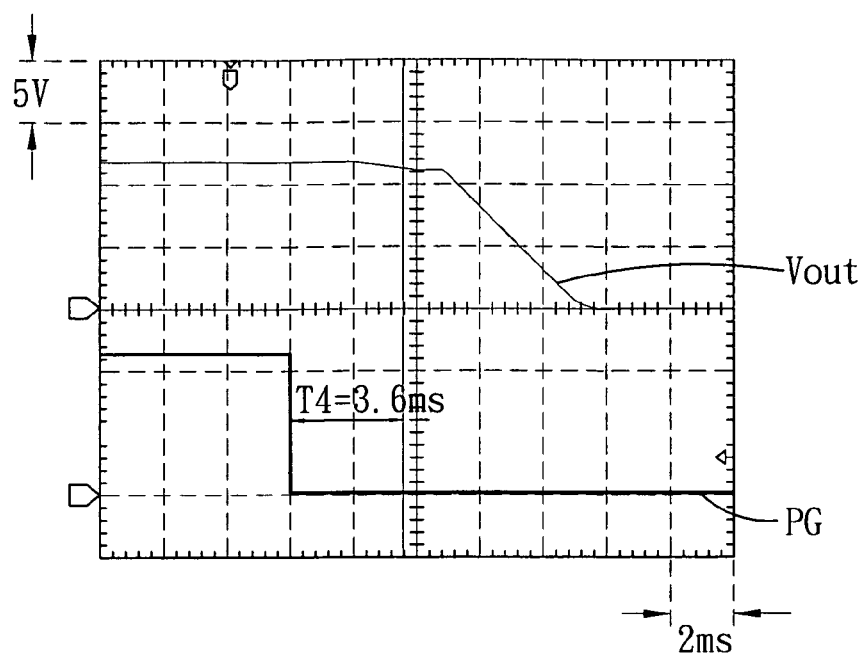
FIG. 7 is a plot illustrating experimental measurement results of the output voltage (Vout) and the first signal (PG) when the preferred embodiment is coupled to a heavy load and generates a working voltage of 90V.
Figure 8:
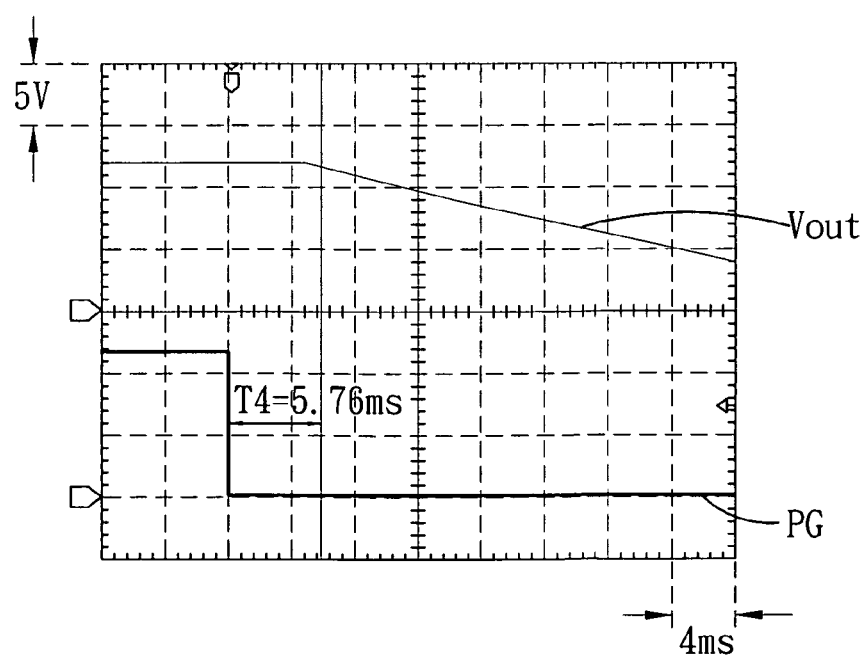
FIG. 8 is a plot illustrating experimental measurement results of the output voltage (Vout) and the first signal (PG) when the conventional power supply is coupled to a light load and generates the working voltage of 90V.
Figure 9:
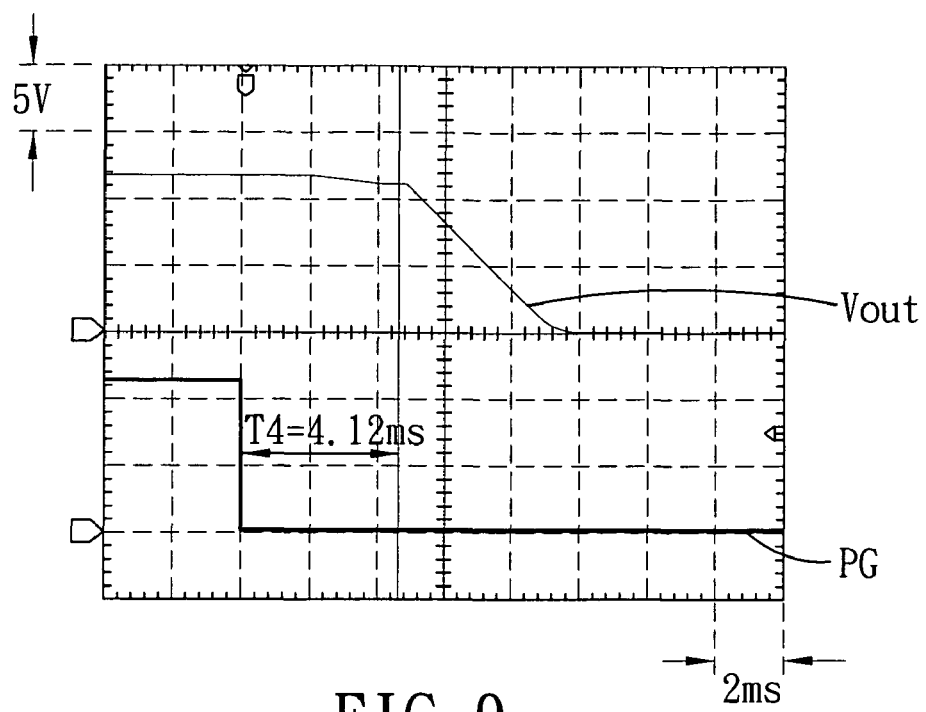
FIG. 9 is a plot illustrating experimental measurement results of the output voltage (Vout) and the first signal (PG) when the preferred embodiment is coupled to a light load and generates a working voltage of 264V.
Figure 10:
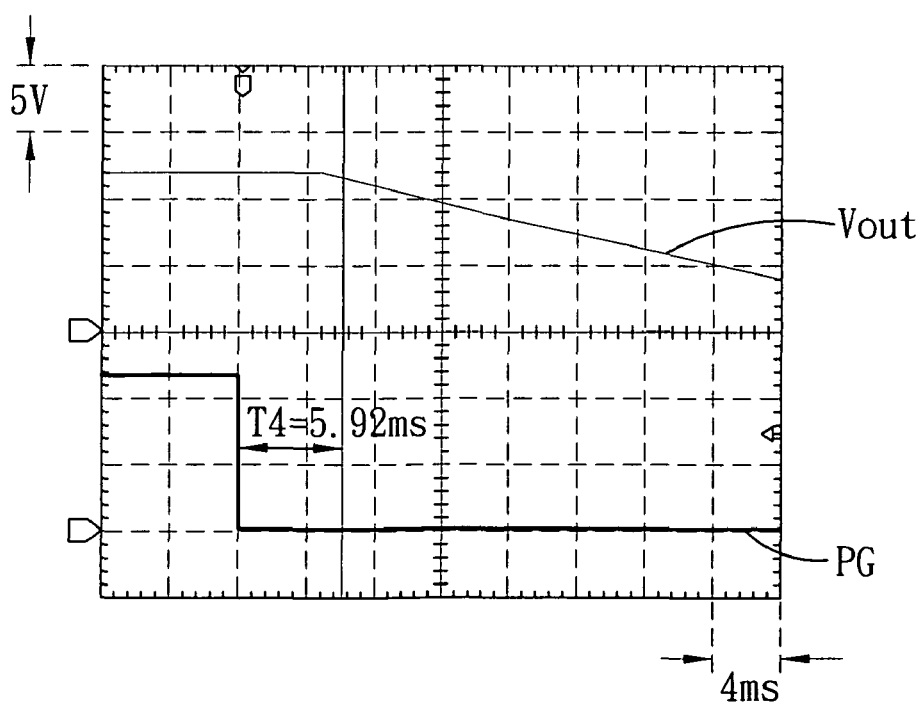
FIG. 10 is a plot illustrating experimental measurement results of the output voltage (Vout) and the first signal (PG) when the conventional power supply is coupled to a light load and generates the working voltage of 264V.

When the power supply 100 is disconnected from the power source 101 during the ON mode, the conventional power supply 100 is switched from the ON mode to a virtual OFF mode, where the fault protection signal (FP) outputted by the monitoring unit 5 has the low logic level and where the power good signal (PG) outputted by the monitoring unit 5 has the low logic level. In this case, the coupling voltage outputted by the coupling circuit 73 has the low logic level, all the transistors (M1, M2, M3) do not conduct, and a capacitor (Ca) is charged through two resistors (Ra, Rb) with the standby voltage such that the clamp signal outputted by the detecting circuit 74 is switched from the low logic level to the high logic level after a delay period. Therefore, the control unit 6 does not receive the working voltage from the voltage generating unit 1 such that the output voltage (Vout) drops to the low level after the warning time period (T4). In this case, for example, when the load 102 is a heavy load, the warning time period (T4) is about 3.6 ms under a first condition where the working voltage is 90V, as shown in FIG. 7, and is about 4.12 ms under a second condition where the working voltage is 264V, as shown in FIG. 9. When the load 102 is a light load, the warning time period (T4) is about 5.76 ms under the first condition, as shown in FIG. 8, and is about 5.92 ms under the second condition, as shown in FIG. 10. Thus, the power supply 100 of this invention has a shorter warning time period (T4) when coupled to a light load as compared to that of the aforesaid conventional power supply 900.

Furthermore, when the power supply 100 is switched from the ON mode to the virtual OFF mode, the monitoring signal outputted by the clamp switch 8 is switched from the high logic level to the low logic level. Thereafter, the power supply 100 can be reset to output the output voltage (Vout) without occurrence of deactivation of the control unit 94 as encountered in the aforesaid conventional power supply 900. Therefore, the power supply 100 of this invention has superior reliability during use.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A power supply adapted for receiving an input voltage from a power source and for outputting an output voltage, said power supply comprising:
    a voltage generating unit adapted to be coupled to the power source for receiving the input voltage therefrom so as to output a working voltage;
    a monitoring unit operable so as to generate a first signal indicating whether said power supply is operated in an ON mode, where said power supply outputs the output voltage, or an OFF mode, where said power supply does not output the output voltage, and a second signal indicating whether said power supply is to output the output voltage;
    a control unit for receiving the working voltage from said voltage generating unit so as to output the output voltage;
    a clamp unit adapted to be coupled to the power source and said voltage generating unit for receiving the input voltage and the working voltage therefrom, and coupled to said monitoring unit for receiving the first and second signals therefrom and for outputting a clamp signal in response to the first and second signals from said monitoring unit;

a clamp switch coupled between said voltage generating unit and said monitoring unit, and having a control end coupled to said clamp unit for receiving the clamp signal therefrom, said clamp switch being operable between an ON-state and an OFF-state in response to the clamp signal from said clamp unit; and a coupling unit coupled among said clamp switch, said voltage generating unit, said monitoring unit and said control unit;

wherein, when said clamp switch is in the ON-state, said coupling unit is operable, in response to the second signal from said monitoring unit, so as to establish electrical connection between said voltage generating unit and said control unit such that said control unit receives the working voltage from said voltage generating unit through said coupling unit; and wherein, when said power supply is switched from the ON mode to the OFF mode, said clamp switch is switched from the ON-state to the OFF-state in response to the clamp signal from said clamp unit such that said coupling unit interrupts electrical connection between said voltage generating unit and said control unit, said control unit outputting the output voltage that drops to a low level after a warning time period in response to electrical disconnection between said voltage generating unit and said control unit.

2. The power supply as claimed in claim 1, wherein:

the first signal outputted by said monitoring unit has a high logic level when said power supply is in the ON mode, and has a low logic level when said power supply is in the OFF mode; and the clamp signal outputted by said clamp unit has a low logic level when said clamp switch is in the ON-state, and has a high logic level when said clamp switch is in the OFF-state.

3. The power supply as claimed in claim 2, wherein:

said voltage generating unit further outputs a standby voltage;

said clamp unit includes
  a control signal generating circuit adapted to be coupled to the power source and outputting a control signal in response to receipt of the input voltage from the power source,
  a coupling circuit coupled to said voltage generating unit and said control signal generating circuit for receiving the control signal and the working and standby voltages therefrom so as to output a coupling voltage, and
  a detecting circuit coupled to said monitoring unit, said clamp switch and said coupling circuit, and outputting the clamp signal to said control end of said clamp switch in response to the coupling voltage from said coupling circuit, and the first and second signals from the monitoring unit; and when said power supply is switched from the ON mode to the OFF mode, the coupling voltage outputted by said coupling circuit is switched from a high logic level to a low logic level while the first signal is switched from the high logic level to the low logic level such that the clamp signal outputted by said detecting circuit is switched from the low logic level to the high logic level.

4. The power supply as claimed in claim 3, wherein said detecting circuit includes:

a pnp transistor having an emitter coupled to said coupling circuit, a base coupled to said monitoring unit for receiving the second signal therefrom, and a collector;

a first NMOS transistor having a drain coupled to said control end of said clamp switch, a gate coupled to said collector of said pnp transistor, and a grounded source; and a second NMOS transistor having a drain coupled to said drain of said first NMOS transistor, a gate coupled to said monitoring unit for receiving the first signal therefrom, and a grounded source.

5. The power supply as claimed in claim 1, wherein:

said clamp switch outputs a monitoring signal to said monitoring unit;

when said power supply is switched from the OFF mode to the ON mode, said clamp switch is switched from the OFF-state to the ON-state, and the monitoring signal outputted by said clamp switch is switched from a low logic level to a high logic level.

6. A clamp unit adapted for controlling a clamp switch of a power supply such that the power supply is in an ON mode, where the power supply outputs an output voltage, when the clamp switch is in an ON-state and that the power supply is in an OFF mode, where the power supply does not output the output voltage, when the clamp switch is in an OFF-state, said clamp unit comprising:

a control signal generating circuit for outputting a control signal in response to receipt of an input voltage;

a coupling circuit coupled to said control signal generating circuit for receiving the control signal therefrom so as to output a coupling voltage in response to first and second reference voltages and the control signal; and a detecting circuit coupled to said coupling circuit for receiving the coupling voltage therefrom, and adapted to output a clamp signal to the clamp switch in response to the coupling voltage from said coupling circuit, a first signal from the power supply indicating whether the power supply is in the ON mode or the OFF mode, and a second signal from the power supply indicating whether the power supply is to output the output voltage.

7. The clamp unit as claimed in claim 6, the first signal from the power supply having a high logic level when the power supply is in the ON mode, and having a low logic level when the power supply is in the OFF mode, wherein:

the clamp signal outputted by said detecting circuit has a low logic level when the clamp switch is in the ON-state, and has a high logic level when the clamp switch is in the OFF-state; and when the power supply is switched from the ON mode to the OFF mode while the first signal is switched from the high logic level to the low logic level, the coupling voltage outputted by said coupling circuit is switched from a high logic level to a low logic level such that the clamp signal outputted by said detecting circuit is switched from the low logic level to the high logic level.

8. The clamp unit as claimed in claim 7, wherein said detecting circuit includes:

a pnp transistor having an emitter coupled to said coupling circuit, a base adapted to be coupled to the power supply for receiving the second signal therefrom, and a collector;

a first NMOS transistor having a drain adapted to be coupled to the clamp switch, a gate coupled to said collector of said pnp transistor, and a grounded source; and a second NMOS transistor having a drain coupled to said drain of said first NMOS transistor, a gate adapted to be coupled to the power supply for receiving the first signal therefrom, and a grounded source.

* * * * *